US008471801B2

(12) United States Patent
Chen et al.

(10) Patent No.: US 8,471,801 B2
(45) Date of Patent: Jun. 25, 2013

(54) DRIVING METHOD OF DISPLAY PANEL WITH HALF-SOURCE-DRIVING STRUCTURE

(75) Inventors: Tung-Huang Chen, Hsin-Chu (TW); Yun-Chung Lin, Hsin-Chu (TW); Yu-Chieh Cho, Hsin-Chu (TW); I-Fang Chen, Hsin-Chu (TW); Chien-Li Chen, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 1003 days.

(21) Appl. No.: 12/509,482

(22) Filed: Jul. 26, 2009

(65) Prior Publication Data

US 2010/0134463 A1 Jun. 3, 2010

(30) Foreign Application Priority Data

Dec. 2, 2008 (TW) ............................... 97146849 A

(51) Int. Cl.

*G09G 3/36* (2006.01)
*G09G 3/20* (2006.01)
*G06F 3/038* (2006.01)

(52) U.S. Cl.

USPC ................. 345/94; 345/55; 345/87; 345/204; 345/211

(58) Field of Classification Search

USPC .............................. 345/87–104, 55, 204, 211
See application file for complete search history.

(56) References Cited

U.S. PATENT DOCUMENTS

| | | | | |
|---|---|---|---|---|
| 6,879,367 | B2 | 4/2005 | Ukita | |
| 6,975,848 | B2 | 12/2005 | Rawlins et al. | |
| 2005/0007324 | A1 | 1/2005 | Inada | |
| 2007/0002243 | A1 | 1/2007 | Kim | |
| 2008/0001886 | A1 * | 1/2008 | Kim et al. | 345/94 |
| 2008/0068365 | A1 * | 3/2008 | Lee | 345/211 |

FOREIGN PATENT DOCUMENTS

| | | |
|---|---|---|
| TW | 200816116 | 4/2008 |
| TW | 200822030 | 5/2008 |
| TW | 200516847 | 10/2009 |
| WO | 2006/064688 A1 | 6/2006 |

* cited by examiner

*Primary Examiner* — Lun-Yi Lao
(74) *Attorney, Agent, or Firm* — WPAT, PC; Justin King

(57) ABSTRACT

An exemplary driving method of a display panel with half-source-driving structure is provided. The display panel includes at least one pixel each using a capacitor to store a voltage. A terminal of the capacitor is adapted to receive a display data inputted from a data line, and another terminal of the capacitor is electrically coupled to a common electrode. The driving method includes: obtaining a direct current power signal; coupling an alternating current signal with the direct current power signal to generate a common electrode driving signal; and applying the common electrode driving signal to the common electrode. A rising time of a rising edge and a falling time of a falling edge of the common electrode driving signal are modified to improve a V-line mura phenomenon of the display panel.

14 Claims, 5 Drawing Sheets

DRIVING METHOD OF DISPLAY PANEL WITH HALF-SOURCE-DRIVING STRUCTURE

CROSS-REFERENCE TO RELATED APPLICATIONS

This application is based upon and claims the benefit of priority from the prior Taiwanese Patent Application No. 097146849, filed Dec. 2, 2008, the entire contents of which are incorporated herein by reference.

BACKGROUND

1. Technical Field

The present invention generally relates to the field of flat panel display and, particularly to a driving method of a display panel with half-source-driving (HSD) structure.

2. Description of the Related Art

Flat panel display devices such as a liquid crystal display (LCD) and a plasma display have the advantages of high image quality, small size, light weight and a broad application range, and thus are widely applied on consumer electronic products such as a mobile phone, a notebook computer, a desktop display and a television, and have gradually replaced the traditional cathode ray tube (CRT) displays as the main trend in the display industry.

Referring to FIG. 1, showing a partial circuit diagram of a conventional display panel 10 with half-source-driving structure. The display panel 10 includes a plurality of data lines S1~S3, a plurality of gate lines G1~G10 and a plurality of pixels. The pixels arranged along the gate lines G1~G10 have different colors (e.g., R, G and B). Each of odd column pixels and an even column pixel adjacent therewith in each pixel row are coupled to a same data line, but the odd column pixel and the even column pixel are coupled to two different gate lines. For example, the first column pixel R and the second column pixel G adjacent therewith in each pixel row are coupled to the same data line S1, but the first column pixel R and the second column pixel G are coupled to two different gate lines G1 and G2.

In addition, each of the pixels uses a storage capacitor Cs to store a voltage. A terminal of the storage capacitor Cs is adapted to receive a display data inputted from a data line, and another terminal of the storage capacitor Cs is electrically coupled to a common electrode Vcom. A common electrode driving signal VCOM1 applied to the common electrode Vcom generally is a square wave signal as illustrated in FIG. 3. Referring to FIG. 2, the square wave signal VCOM1 is generated by coupling an alternating current signal AC1 with a direct current power signal DC together. The alternating current signal AC1 can be obtained by a square wave signal (not labeled, see FIG. 2) inputted to an input terminal of a capacitor C1 flowing through the capacitor C1. Herein, A waveform of the alternating current signal AC1 is the same as that of the common electrode driving signal VCOM 1 except the absent direct current component DC.

During the display of the display panel 10 with half-source-driving structure, the gate lines G1~G10 are sequentially enabled, and each of the data lines S1~S3 supplies two adjacent pixels in each pixel row with display data one after another. A pixel to which the display data is written first has two adjacent pixels to which the display data are written later, the two adjacent pixels are located at two opposite sides of the pixel, and the display data written to the two adjacent pixels have the same polarity when the display panel 10 is operated at traditional line inversion, column inversion or dot inversion mode. Since the two adjacent pixels provided with the same polarity display data and written later would apply capacitive coupling with same coupling direction to the pixel, a voltage stored in the storage capacitor Cs of the pixel to which the display data is written first is subject to be modulated by the two adjacent pixels thereof. As a result, a resultant voltage stored in the storage capacitor Cs of the pixel being first charged is different from an expected voltage, and thus a V-line mura phenomenon will occur during the display of the display panel 10.

BRIEF SUMMARY

The present invention relates to a driving method of a display panel with half-source-driving structure for improving the V-line mura phenomenon of the display panel.

In order to achieve the above-mentioned advantage, a driving method of a display panel with half-source-driving structure, in accordance with an embodiment of the present invention, is provided. The display panel includes at least one pixel each using a capacitor to store a voltage. A terminal of the capacitor is adapted to receive a display data inputted from a data line, and another terminal of the capacitor is electrically coupled to a common electrode. The driving method includes the following steps: obtaining a direct current power signal; coupling an alternating current signal with the direct current power signal to generate a common electrode driving signal; and applying the common electrode driving signal to the common electrode. A rising time of a rising edge and a falling time of a falling edge of the common electrode driving signal are modified to improve a V-line mura phenomenon of the display panel.

In one embodiment, the modification of waveform of the common electrode driving signal is carried out by modifying a waveform of the alternating current signal.

In one embodiment, the alternating current signal includes a stepped waveform with step-up and step-down portions.

In one embodiment, at least one rising edge of the alternating current signal each uses at least two different rising speeds, and the latter rising speed is slower than the former rising speed.

In one embodiment, at least one falling edge of the alternating current signal each uses at least two different falling speeds, and the latter falling speed is slower than the former falling speed.

In one embodiment, the driving method further includes the following steps: providing a square wave signal; and modifying the square wave signal to form the alternating current signal. Wherein, a rising time and a falling time of the alternating current signal are respectively longer than a corresponding rising time and a corresponding falling time of the square wave signal.

In one embodiment, the steps of modifying the square wave signal to form the alternating current signal includes: receiving the square wave signal; and delivering the square wave signal through a signal transmission circuit. Wherein, a resistance of the signal transmission circuit is set to can achieve the modification of the square wave signal so that the alternating current signal is formed.

In one embodiment, the resistance of the signal transmission circuit is fixed.

In one embodiment, the resistance of the signal transmission circuit is adjustable.

In one embodiment, the resistance of the signal transmission circuit satisfies the equation of $Y=a*X+d$; where Y represents the rising time or the falling time and a unit thereof is microsecond (μs), X represents the resistance of the signal transmission circuit and a unit thereof is ohm (Ω), 0.015<a<0.12, and 0.01<d<12.

In one embodiment, the modification of waveform of the common electrode driving signal is carried out by modifying the resistance of a signal transmission circuit for delivering the common electrode driving signal.

A driving method of a display panel with half-source-driving structure, in accordance with another embodiment of the present invention, is provided. The display panel includes at least one pixel each using a capacitor to store a voltage. A terminal of the capacitor is adapted to receive a display data inputted from a data line, and another terminal of the capacitor is electrically coupled to a common electrode. The driving method includes: modifying a rising time of a rising edge and a falling time of a falling edge of a common electrode driving signal applied to the common electrode to improve a V-line mura phenomenon of the display panel.

A driving method of a display panel with half-source-driving structure, in accordance with still another embodiment of the present invention, is provided. The display panel includes at least one pixel each using a capacitor to store a capacitor. A terminal of the capacitor is adapted to receive a display data inputted from a data line, and another terminal of the capacitor is electrically coupled to a common voltage. The driving method includes the following steps: obtaining a direct current power signal; coupling a deformed square wave signal with the direct current power signal to generate a common electrode driving signal; and applying the common electrode driving signal to the common electrode. Furthermore, the deformed square wave can be a corner-cut square wave signal, a rounded-corner square wave signal, a stepped square wave signal or other suitable deformed square wave signal.

In the above-mentioned various embodiments of the present invention, since a waveform of the common electrode driving signal applied to the common electrode is modified, the rising time of the rising edge and the falling time of the falling edge of the common electrode driving signal are varied. Accordingly, the V-line mura phenomenon of the display panel can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

A driving method of a display panel with half-source-driving structure in accordance with an embodiment of the present invention is provided. The display panel (please refer to FIG. 1) includes a plurality of pixels. Each of the pixels uses a storage capacitor to store a voltage, a terminal of the capacitor is adapted to receive a display data inputted from a data line, and another terminal of the capacitor is electrically coupled to a common electrode.

Figure 4:
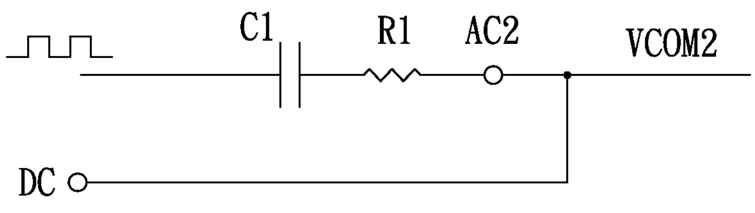
FIG. 4 illustrates a generation method of a common electrode driving signal in accordance with an embodiment of the present invention.
Figure 5:
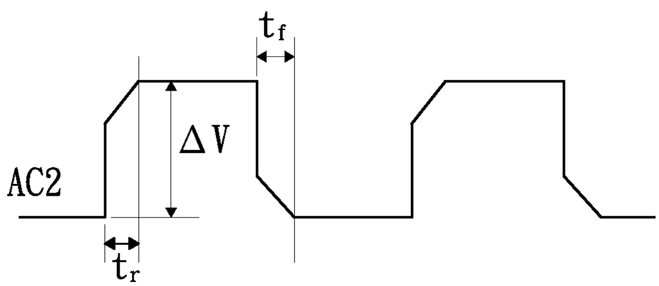
FIG. 5 shows a magnified waveform of an alternating current signal of FIG. 4.

Referring to FIGS. 4 and 5, the driving method in accordance with the present embodiment includes the following steps (1)~(3):

(1) obtaining a direct current power signal DC.

(2) coupling an alternating current signal AC2 with the direct current power signal DC to generate a common electrode driving signal VCOM2. FIG. 5 shows a magnified waveform of the alternating current signal AC2. The alternating current signal AC2 is a corner-cut square wave signal. A rising time (i.e., a time interval of a voltage changing from a low level to a high level, a voltage difference between the low level and the high level is ^V) of a rising edge of the alternating current signal AC2 is $t_r$, and a falling time (i.e., a time interval of a voltage changing from the high level to the low level) of a falling edge of the alternating current signal AC2 is $t_f$. It is understood that, since the common electrode driving signal VCOM2 is generated by coupling the alternating current signal AC2 with the direct current power signal DC, a waveform of the common electrode driving signal VCOM2 is the same as that of the alternating current signal AC2 except the additional direct current component DC.

Figure 3:
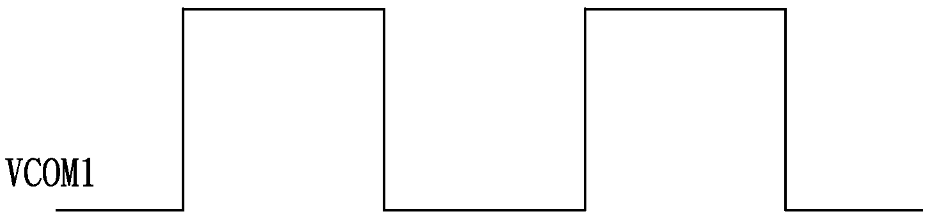
FIG. 3 (Prior Art)
FIG. 3 shows a magnified waveform of the common electrode driving signal of FIG. 2.

Compared FIG. 5 with FIG. 3, it is found that the common electrode driving signal VCOM2 is a deformed square wave signal with respect to the common electrode driving signal VCOM 1 as illustrated in FIG. 3. In particular, a rising time (generally equal to the rising time $t_r$ of the alternating current signal AC2) of a rising edge and a falling time (generally equal to the falling time $t_f$ of the alternating current signal AC2) of a falling edge of the common electrode driving signal VCOM2 is modified, so that the V-line mura phenomenon of the display panel is improved.

Furthermore, the modification of waveform of the common electrode driving signal VCOM2 is carried out by modifying the waveform of the alternating current signal AC2. More specifically, the waveform modification of the alternating current signal AC2 includes: providing a square wave signal (not labeled, see FIG. 4); and delivering the square wave signal through a signal transmission circuit to form the alternating current signal AC2. The signal transmission circuit includes a capacitor C1 and a resistor R1, the square wave signal is received by an input terminal of the capacitor C1, the resistor R1 of the signal transmission circuit is set to have a value can achieve the modification of the square wave signal so that the alternating current signal AC2 is formed. The value of the resistor R1 is fixed. Since the alternating current signal AC2 is a corner-cut square wave signal, the rising time $t_r$ and the falling time $t_f$ is increased with respect to the received square wave signal; in other words, the rising time $t_r$ and the falling time $t_f$ are respectively longer than corresponding rising time and falling time of the received square wave signal.

Figure 1:
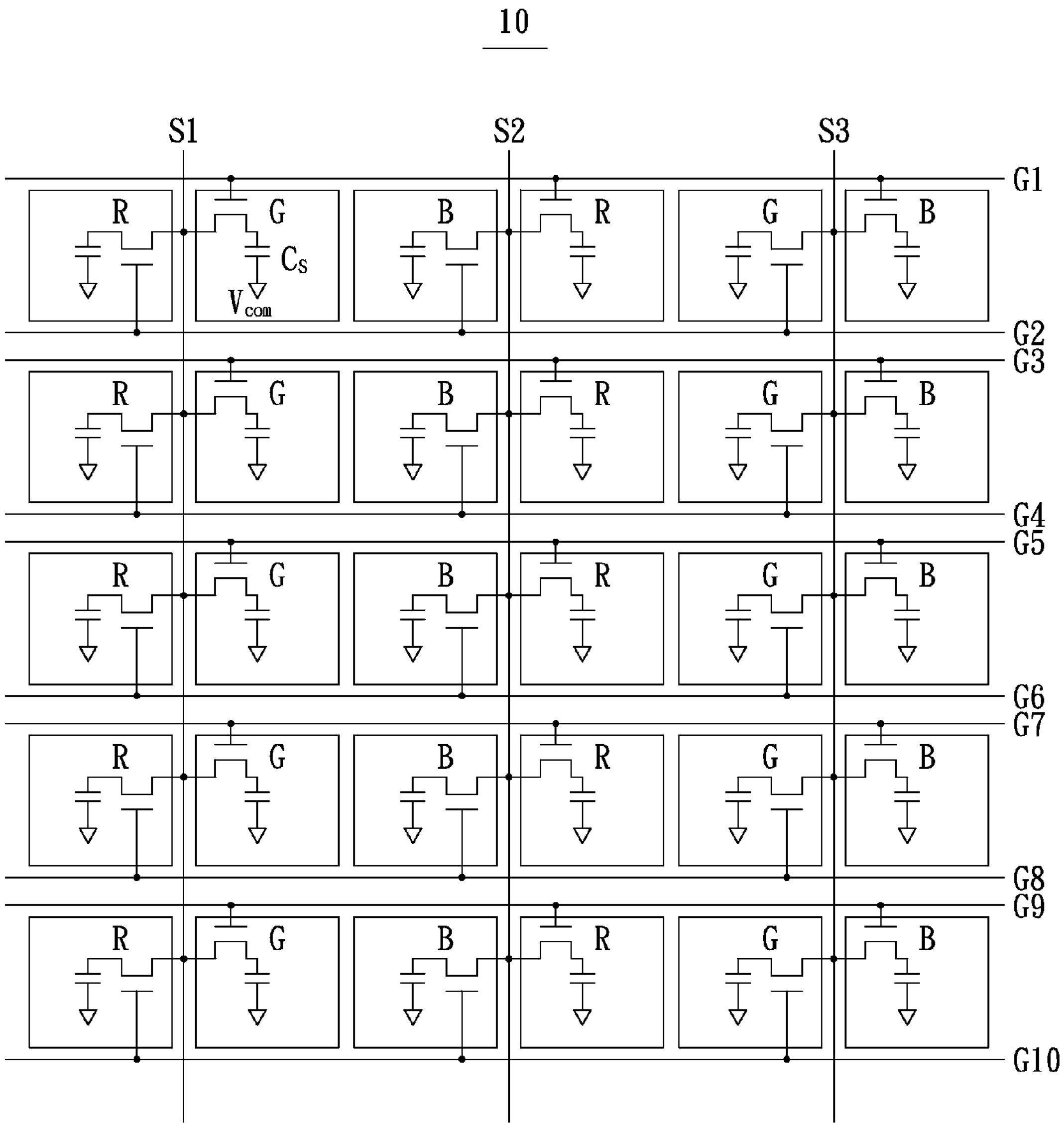
FIG. 1 (Prior Art)
FIG. 1 shows a schematic, partial circuit diagram of a conventional display panel with half-source-driving structure.
Figure 2:
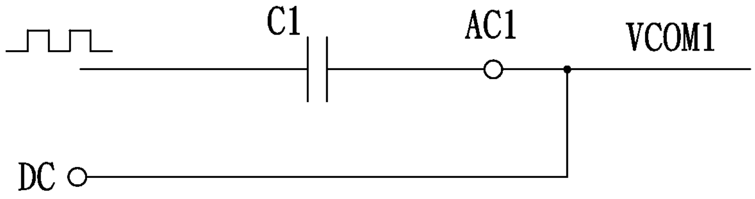
FIG. 2 (Prior Art)
FIG. 2 illustrates a conventional generation method of a common electrode driving signal.

(3) applying the common electrode driving signal VCOM2 to the common electrode (please refer to the label "Vcom" of FIG. 1). Accordingly, the V-line mura phenomenon of the display panel can be improved.

Figure 6:
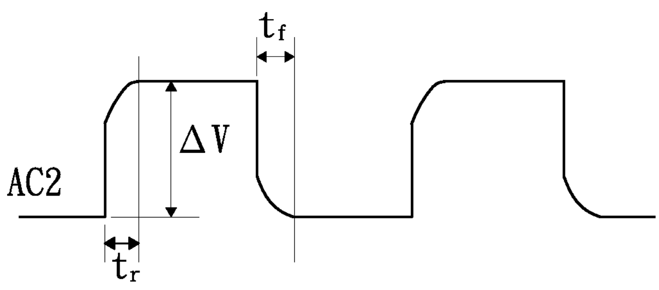
FIG. 6 shows a magnified waveform of another alternating current signal in accordance with an embodiment of the present invention.

In addition, the alternating current signal AC2 in the above-mentioned embodiment is not limited to be the corner-cut square wave signal as illustrated in FIG. 5, and can be other deformed square wave signal such as a rounded-corner square wave signal as illustrated in FIG. 6. In particular, the formation of the rounded-corner square wave signal as illustrated in FIG. 6 can be realized by setting the value of the resistor R1 of the signal transmission circuit of FIG. 4.

Figure 7:
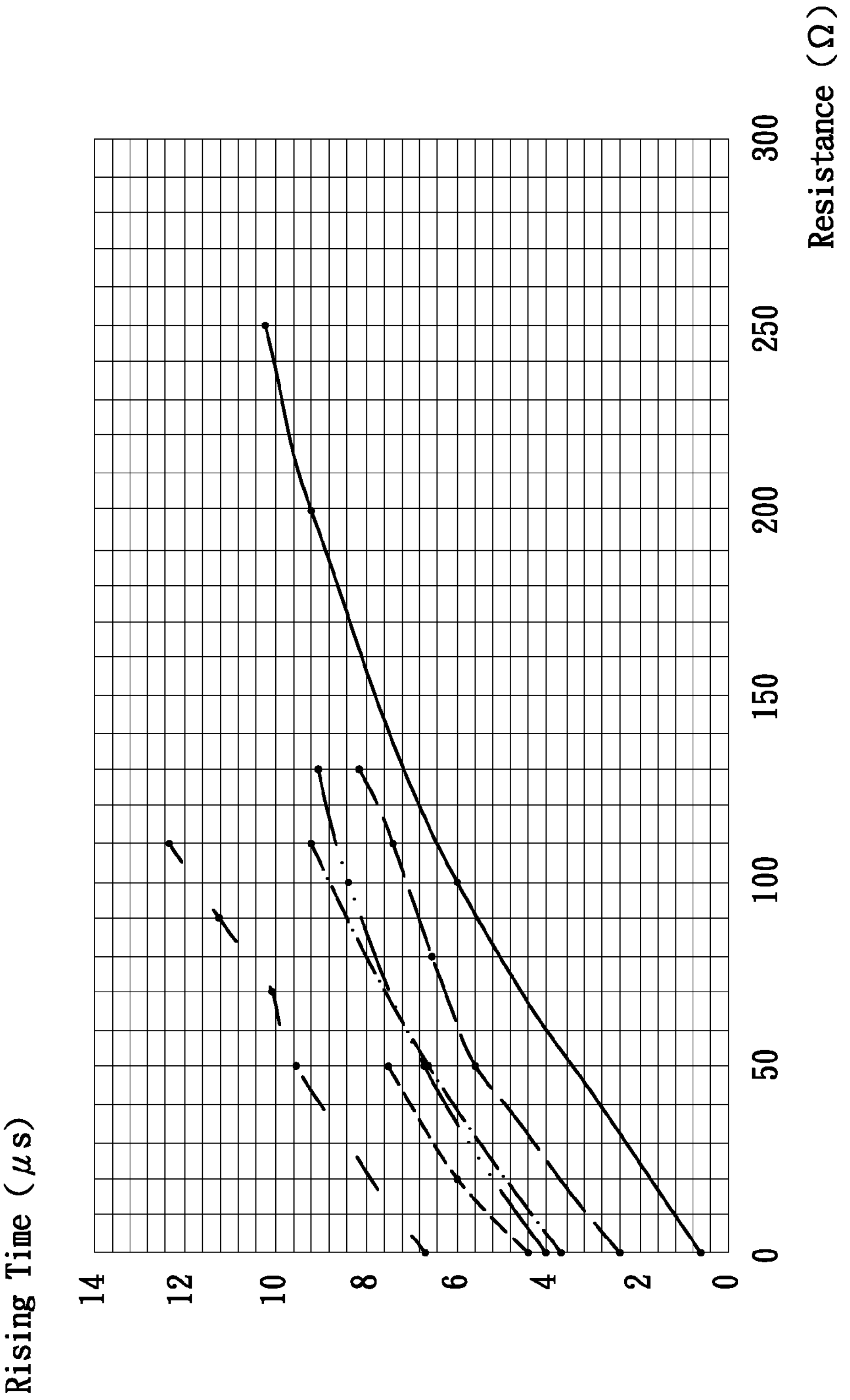
FIG. 7 shows relationship curves of rising times of a rising edge of a common electrode driving signal and resistances, associated with a plurality of display panels.

In regard to the approach of obtaining the alternating current signal AC2 by setting the value of the resistor R1 of the signal transmission circuit in accordance with the above-mentioned embodiments, FIG. 7 shows an experimental result of relationship curves of rising times of the common electrode driving signal VCOM2 and resistances, associated with a plurality of display panels. Each intercept d on the vertical axis in FIG. 7 represents a rising time of the common electrode driving signal VCOM2 outputted from one display panel in the situation that the resistor R1 is not added (i.e., the value of R1 is zero). By simply linear fitting each of the relationship curves, a linear equation $Y=a*X+d$ is obtained. Where Y represents the rising time and a unit thereof is microsecond (μs), X represents the value of the resistor R1 of the signal transmission circuit and a unit thereof is ohm (Ω), $0.015<a<0.12$ and $0.01<d<12$ μs. Therefore, when the value of the resistor R1 satisfies the linear equation, the waveform of the alternating current signal AC2 can be modified to have a predetermined shape and the purpose of improving the V-line mura phenomenon of the display panel can be achieved as a result. As seen from FIGS. 5 and 6, the falling edge and the rising edge of the common electrode driving signal VCOM2 have similar waveforms, therefore a relationship between the rising time of the common electrode driving signal VCOM2 and the value of the resistor R1 also satisfies the linear equation $Y=a*X+d$.

Figure 8:
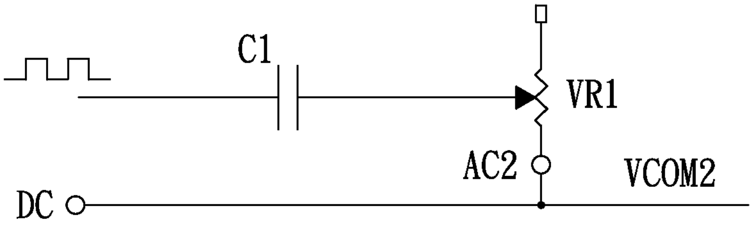
FIG. 8 illustrates another generation method of a common electrode driving signal in accordance with an embodiment of the present invention.

Additionally, the resistor R1 of the signal transmission circuit in FIG. 4 can be replaced by the variable resistor VR1 as illustrated in FIG. 8, so that the resistance of signal transmission circuit can be adjusted in some extent. In this situation, the waveform of the alternating current signal AC2 also can be modified to have the predetermined shape and thus the purpose of improving the V-line mura phenomenon of the display panel still can be achieved.

Figure 9:
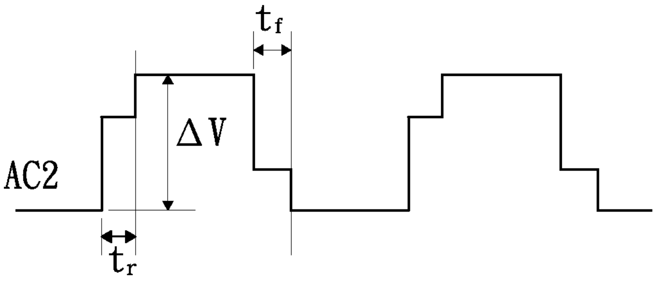
FIG. 9 shows a magnified waveform of still another alternating current signal in accordance with an embodiment of the present invention.

It is indicated that, the obtainment of the alternating current signal AC2 is not limited to the above-mentioned approach of using the signal transmission circuit to deliver a square wave signal, and can use a signal source to directly provide the corner-cut square wave signal as illustrated in FIG. 5, the rounded-corner square wave signal as illustrated in FIG. 6, the stepped square wave signal as illustrated in FIG. 9 or other suitable deformed square wave signal, rather than using the signal transmission circuit. More specifically, as illustrated in FIG. 5, the rising edge of the corner-cut square wave signal uses two different rising speeds (corresponding to two different slopes of line), and the latter rising speed is slower than the former rising speed. Likewise, the falling edge of the corner-cut square wave signal uses two different falling speeds, and the latter falling speed is slower than the former falling speed. As illustrated in FIG. 6, the rising edge of the rounded-corner square wave signal can be considered as using multiple different rising speeds (corresponding to multiple different slopes of tangent line), and the latter rising speed is slower than the former rising speed. Likewise, the falling edge of the rounded-corner square wave signal can be considered as using multiple different falling speeds, and the latter falling speed is slower than the former falling speed. As illustrated in FIG. 9, the stepped square wave signal includes a stepped waveform with step-up and step-down portions.

In another embodiment of the present invention, the modification of waveform of the common electrode driving signal VCOM2 is carried out by modifying the resistance of a signal transmission circuit for delivering the common electrode driving signal VCOM2, rather than modifying the waveform of the alternating current signal AC2.

Specifically, before the common electrode driving signal VCOM2 flowing through the signal transmission circuit of which the resistance is modified, the waveform of the common electrode driving signal VCOM2 can be the square wave as illustrated in FIG. 3. After the common electrode driving signal VCOM2 flowing through the signal transmission circuit of which the resistance is modified, the waveform of the common electrode driving signal VCOM2 is modified to be a deformed square wave such as the corner-cut square wave as illustrated in FIG. 5 or the rounded-corner square wave as illustrated in FIG. 6. Furthermore, the resistance of the signal transmission circuit can satisfy the linear equation: $Y=a*X+d$, where Y represents a rising time of the common electrode driving signal VCOM2 and a unit thereof is microsecond (μs), X represents the resistance of the signal transmission circuit and a unit thereof is ohm (Ω), $0.015<a<0.12$ and $0.01<d<12$. In addition, the modification of the resistance of the signal transmission circuit for delivering the common electrode driving signal VCOM2 can be carried out by one of the following approaches: modifying a transmission line for the common electrode driving signal VCOM2 on a substrate to be a snake-like shape so as to increase the length thereof so that a suitable line resistance is provided, cutting off one of a plurality of transmission lines, or using a transmission line with narrow line width.

In summary, in the above-mentioned various embodiments of the present invention, since a waveform of the common electrode driving signal applied to the common electrode, with respect to the prior art, is modified, the rising time of the rising edge and the falling time of the falling edge of the common electrode driving signal are varied. Accordingly, the V-line mura phenomenon of the display panel can be improved.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A driving method of a display panel with half-source-driving structure, the display panel comprising at least one pixel each using a capacitor to store a voltage, a terminal of the capacitor adapted to receive a display data inputted from a data line, and another terminal of the capacitor electrically coupled to a common electrode; the driving method comprising:

obtaining a direct current power signal;

coupling an alternating current signal with the direct current power signal to generate a common electrode driving signal; and applying the common electrode driving signal to the common electrode, wherein a rising time of a rising edge and a falling time of a falling edge of the common electrode driving signal are modified to improve a V-line mura phenomenon of the display panel, wherein the modification of waveform of the common electrode driving signal is carried out by modifying a waveform of the alternating current signal, providing a square wave signal; and modifying the square wave signal to form the alternating current signal;

wherein the step of modifying the square wave signal to form the alternating current signal, comprising:

receiving the square wave signal; and delivering the square wave signal through a signal transmission circuit, wherein a resistance of the signal transmission circuit is set to achieve the modification of the square wave signal so that the alternating current signal is formed;

wherein the resistance of the signal transmission circuit satisfies the equation of $Y=a*X+d$, where Y represents the rising time or the falling time and a unit thereof is microsecond, X represents the resistance and a unit thereof is ohm, $0.015<a<0.12$ and $0.01<d<12$.

2. The driving method as claimed in claim 1, further comprising: wherein a rising time and a falling time of the alternating current signal are respectively longer than a corresponding rising time and a corresponding falling time of the square wave signal.

3. The driving method as claimed in claim 2, wherein the resistance of the signal transmission circuit is fixed.

4. The driving method as claimed in claim 2, wherein the resistance of the signal transmission circuit is adjustable.

5. The driving method as claimed in claim 1, wherein the alternating current signal comprises a stepped waveform with step-up and step-down portions.

6. The driving method as claimed in claim 1, wherein at least one rising edge of the alternating current signal each uses at least two different rising speeds, and the latter rising speed is slower than the former rising speed.

7. The driving method as claimed in claim 1, wherein at least one falling edge of the alternating current signal each uses at least two different falling speeds, and the latter falling speed is slower than the former falling speed.

8. The driving method as claimed in claim 1, wherein the signal transmission circuit is for delivering the common electrode driving signal.

9. A driving method of a display panel with half-source-driving structure, the display panel comprising at least one pixel each using a capacitor to store a voltage, a terminal of the capacitor adapted to receive a display data inputted from a data line, and another terminal of the capacitor electrically coupled to a common electrode; the driving method is characterized in that comprising:

modifying a rising time of a rising edge and a falling time of a falling edge of a common electrode driving signal applied to the common electrode to improve a V-line mura phenomenon of the display panel, coupling an alternating current signal with a direct current power signal to generate the common electrode driving signal, wherein the modification the rising time of the rising edge and the falling time of the falling edge of the common electrode driving signal is carried out by modifying the alternating current signal, receiving a square wave signal;

delivering the square wave signal through a signal transmission circuit; and modifying a resistance of the signal transmission circuit for delivering the alternating current signal so that the waveform of the alternating current signal is modified to have a predetermined shape, wherein the resistance of the signal transmission circuit satisfies the equation of $Y=a*X+d$, where Y represents the rising time or the falling time and a unit thereof is microsecond, X represents the resistance and a unit thereof is ohm, $0.015<a<0.12$ and $0.01<d<12$.

10. The driving method as claimed in claim 9, wherein the alternating current signal comprises a stepped waveform with step-up and step-down portions.

11. The driving method as claimed in claim 9, wherein at least one rising edge of the alternating current signal each uses at least two different rising speeds and the latter rising speed is slower than the former rising speed; and at least one falling edge of the alternating current signal each uses at least two different falling speeds and the latter falling speed is slower than the former falling speed.

12. The driving method as claimed in claim 9, wherein the signal transmission circuit is for delivering the common electrode driving signal.

13. A driving method of a display panel with half-source-driving structure, the display panel comprising at least one pixel each using a capacitor to store a voltage, a terminal of the capacitor adapted to receive a display data inputted from a data line, and another terminal of the capacitor electrically coupled to a common electrode; the driving method comprising:

obtaining a direct current power signal;

coupling a deformed square wave signal with the direct current power signal to generate a common electrode driving signal; and applying the common electrode driving signal to the common electrode, wherein a rising time of a rising edge and a falling time of a falling time of the common electrode driving signal are modified to improve a V-line mura phenomenon of the display panel;

wherein the provision of the deformed square wave signal comprises:

receiving a square wave signal; and delivering the square wave signal through a signal transmission circuit, wherein a resistance of the signal transmission circuit is set to achieve the modification of the square wave signal so that the deformed square wave signal is provided;

wherein the resistance of the signal transmission circuit satisfies the equation of $Y=a*X+d$, where Y represents the rising time or the falling time and a unit thereof is microsecond, X represents the resistance and a unit thereof is ohm, $0.015<a<0.12$ and $0.01<d<12$.

14. The driving method as claimed in claim 13, wherein the deformed square wave signal is one of a corner-cut square wave signal, a rounded-corner square wave signal and a stepped square wave signal.

* * * * *